(12) United States Patent
Chilton

(10) Patent No.: US 6,948,031 B2
(45) Date of Patent: Sep. 20, 2005

(54) METHODS AND APPARATUS FOR TRANSFERRING A DATA ELEMENT WITHIN A DATA STORAGE SYSTEM

(75) Inventor: Kendell A. Chilton, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 429 days.

(21) Appl. No.: 09/741,494

(22) Filed: Dec. 19, 2000

(65) Prior Publication Data

US 2002/0078292 A1 Jun. 20, 2002

(51) Int. Cl.[7] .................................... G06F 13/16
(52) U.S. Cl. .................... 711/113; 710/30; 710/74
(58) Field of Search ................... 711/113, 118; 710/30, 74

(56) References Cited

U.S. PATENT DOCUMENTS

| | | | | | |
|---|---|---|---|---|---|
| 5,819,054 | A | * | 10/1998 | Ninomiya et al. .............. | 712/3 |
| 5,890,207 | A | * | 3/1999 | Sne et al. .................... | 711/113 |
| 5,943,287 | A | * | 8/1999 | Walton ................... | 365/230.03 |
| 6,145,042 | A | * | 11/2000 | Walton ........................ | 710/112 |
| 6,389,494 | B1 | * | 5/2002 | Walton et al. ............... | 710/317 |
| 6,425,034 | B1 | * | 7/2002 | Steinmetz et al. ........... | 710/305 |
| 6,516,390 | B1 | | 2/2003 | Chilton et al. .............. | 711/138 |
| 6,578,108 | B1 | * | 6/2003 | Fujimoto et al. ............ | 711/114 |
| 2003/0140192 | A1 | * | 7/2003 | Thibault et al. ............. | 710/305 |

* cited by examiner

Primary Examiner—Reginald G. Bragdon
(74) Attorney, Agent, or Firm—David E. Huang, Esq.

(57) ABSTRACT

The invention is directed to techniques for transferring data within a data storage system that includes, among other things, an interconnection mechanism having a point-to-point channel between an interface circuit (e.g., a director) and a volatile memory cache circuit. The point-to-point channel allows the interface circuit and the volatile memory cache circuit to have contention free access to each other. One arrangement of the invention is directed to a data storage system having a volatile memory cache circuit that buffers data elements exchanged between a storage device and a host, an interface circuit that operates as an interface between the volatile memory cache circuit and at least one of a storage device and a host, and a point-to-point channel interconnected between the volatile memory cache circuit to the interface circuit.

47 Claims, 8 Drawing Sheets

ACCESS REQUEST FORMAT 140 (E.G., WRITE REQUEST)

| SOF 144 | COMMAND 146 | ADDRESS 148 | TAG 150 | ERROR DETECTION CODE 152 |

DATA ELEMENT PORTION FORMAT 142 (E.G., WRITE DATA)

| MOF 154 | DATA 156 | ERROR DETECTION CODE 158 | EOF 160 |

FIG. 5A

STATUS MESSAGE FORMAT 170 (E.G., WRITE ACKNOWLEDGMENT)

| MOF 172 | TAG 174 | FILL 176 | STATUS 178 | ERROR DETECTION CODE 180 | EOF 182 |

FIG. 5B

ACCESS REQUEST FORMAT 190 (E.G., READ REQUEST)

| SOF 192 | COMMAND 194 | ADDRESS 196 | TAG 198 | ERROR DETECTION CODE 200 | EOF 202 |

FIG. 6A

DATA ELEMENT PORTION FORMAT 210 (E.G., READ DATA)

| SOF 214 | DATA 216 | ERROR DETECTION CODE 218 |

STATUS MESSAGE FORMAT 212 (READ ACKNOWLEDGMENT)

| MOF 220 | TAG 222 | FILL 224 | STATUS 226 | ERROR DETECTION CODE 228 | EOF 230 |

FIG. 6B

METHODS AND APPARATUS FOR TRANSFERRING A DATA ELEMENT WITHIN A DATA STORAGE SYSTEM

BACKGROUND OF THE INVENTION

In general, a data storage system stores and retrieves data for one or more external hosts. FIG. 1 shows a high-level block diagram of a conventional data storage system 20. The data storage system 20 includes front-end circuitry 22, a cache 24, back-end circuitry 26 and a set of disk drives 28-A, 28-B (collectively, disk drives 28). The cache 24 operates as a buffer for data exchanged between external hosts 30 and the disk drives 28. The front-end circuitry 22 operates as an interface between the hosts 30 and the cache 24. Similarly, the back-end circuitry 26 operates as an interface between the cache 24 and the disk drives 28.

FIG. 1 further shows a conventional implementation 32 of the data storage system 20 that has a set of buses for carrying address information and data to and from the various data storage system components, i.e., to and from the front-end circuitry 22, the cache 24 and the back-end circuitry 26. In the implementation 32, the front-end circuitry 22 includes multiple front-end circuit boards 34. Each front-end circuit board 34 includes a pair of front-end directors 36-A, 36-B. Each front-end director 36 (e.g., the front-end director 36-A of the front-end circuit board 34-1) is interconnected between a particular host 30 (e.g., the host 30-A) and a set of M buses 38 (sometimes referred to as parallel multi-drop buses) that lead to the cache 24 (M being a positive integer), and operates as an interface between that host 30 and the cache 24. Similarly, the back-end circuitry 26 includes multiple back-end circuit boards 40. Each back-end circuit board 40 includes a pair of back-end directors 42-A, 42-B. Each back-end director 42 is interconnected between a particular disk drive 28 and the M buses 38 leading to the cache 24, and operates as an interface between that disk drive 28 and the cache 24.

Each disk drive 28 has multiple connections 44, 46 to the cache 24. For example, the disk drive 28-A has a first connection 44-A that leads to the cache 24 through the back-end director 42-A of the back-end circuit board 40-1, and a second connection 46-A that leads to the cache 24 through another back-end director of another back-end circuit board 40 (e.g., a back-end director of the back-end circuit board 40-2). The multiple connections 44, 46 provide fault tolerant features (e.g., the capability to store and retrieve data even when one of the connections 44, 46 becomes unavailable) and optimization features (e.g., the capability to load balance across the connections 44, 46).

For a host 30 to store data on the disk drives 28, the host 30 provides the data to one of the front-end directors 36. That front-end director 36 then performs a write operation by providing the data to the cache 24 through one of the M buses 38. Next, one of the back-end directors 42 reads the data from the cache 24 through one of the M buses 38 and stores the data in one or more of the disk drives 28. To expedite data transfer, the front-end director 36 can place a message for the back-end director 42 in the cache 24 when writing the data to the cache 24. The back-end director 42 can then respond as soon as it detects the message from the front-end director 36. Similar operations occur for a read transaction but in the opposite direction (i.e., data moves from the back-end director 42 to the front-end director 36 through the cache 24).

SUMMARY OF THE INVENTION

Unfortunately, there are deficiencies to the above-described conventional implementation 32 of the data storage system 20 of FIG. 1. In particular, the set of M buses 38 has limited scaling capabilities. That is, as more front-end and back-end circuit boards 34, 40 are added to the system 20 to increase the performance and capacity of the data storage system implementation 32, the more congested the buses 38 become. Conventional bus architecture features such as locking and arbitration mechanisms tend to limit bus availability even further. Eventually, the buses 38 become a bottleneck causing some front-end directors 36 and back-end directors 42 to wait excessively long amounts of time for bus access. In some high-traffic situations, the external hosts 30 perceive the resulting delays as unsatisfactory latencies.

In contrast to the above-described conventional data storage system implementation 32 which uses multi-drop buses for its interconnection mechanism, the invention is directed to techniques for transferring data within a data storage system that includes, among other things, an interconnection mechanism having a point-to-point channel between an interface circuit (e.g., a director) and a volatile memory cache circuit. The point-to-point channel allows the interface circuit and the volatile memory cache circuit to have contention free access to each other. Such access is superior to the blocking nature of the conventional bus topology data storage system. In particular, the contention free access provided by the invention essentially alleviates interconnection mechanism delays, e.g., delays due to other devices using the bus, delays due to bus allocation (e.g., bus arbitration cycles), etc. Furthermore, the point-to-point nature of communications between devices of the data storage system (e.g., the interface and volatile memory cache circuits) essentially makes such communication independent of the number of devices within the data storage system thus improving scalability of the data storage system.

One arrangement of the invention is directed to a data storage system having a volatile memory cache circuit that buffers data elements exchanged between a storage device and a host, an interface circuit that operates as an interface between the volatile memory cache circuit and at least one of the storage device and the host, and a point-to-point channel interconnected between the volatile memory cache circuit to the interface circuit. The point-to-point channel carries the data elements between the volatile memory cache circuit and the interface circuit. The use of the point-to-point channel alleviates contention for the communications medium and thus avoids unnecessary latencies caused by the communications medium.

In one arrangement, the point-to-point channel includes a set of unidirectional serial asynchronous links that is capable of carrying signals (e.g., a command, a data element, etc.) from the interface circuit to the volatile memory cache circuit, and another set of unidirectional serial asynchronous links that is capable of carrying signals (e.g., status, a data element, etc.) from the volatile memory cache circuit to the interface circuit. In such an arrangement, bandwidth through the channel can be increased by increasing the number of unidirectional serial asynchronous links in each of the sets.

In one arrangement, the interface circuit is configured to provide a respective portion of a data element framed with synchronization delimiters to the volatile memory cache circuit through each of the first set of unidirectional serial asynchronous links during a write transaction (e.g., even bytes of the data element through one link and odd bytes of the data element through another link). Here, the interface circuit is further configured to obtain a respective portion of a data element framed with synchronization delimiters from the volatile memory cache circuit through each of the second set of unidirectional serial asynchronous links during a read transaction. Accordingly, the point-to-point channel is well-suited for handling read transactions, write transactions and even read-modify-write transactions.

In one arrangement, the interface circuit is configured to provide a respective portion of a data element and a corresponding multiple bit error detection code to the volatile memory cache circuit through each of the first set of unidirectional serial asynchronous links during a write transaction. Additionally, the interface circuit is configured to obtain a respective portion of a data element and a corresponding multiple bit error detection code from the volatile memory cache circuit through each of the second set of unidirectional serial asynchronous links during a read transaction. The error detection codes enable the data storage system to detect errors that occur during transmission of data through a single link.

In one arrangement, the interface circuit is configured to provide portions of a data element as data codes, vis-à-vis control codes, to the volatile memory cache circuit through the first set of unidirectional serial asynchronous links during a write transaction. Furthermore, the interface circuit is configured to obtain portions of a data element as data codes from the volatile memory cache circuit through the second set of unidirectional serial asynchronous links during a read transaction. For example, the data codes can belong to an 8B/10B encoding/decoding data space. The use of control and data codes provides for well-organized and efficient communications (e.g., the capability to discern control delimiters, etc.), as well as another level of error detection for robust error handling within the data storage system.

In one arrangement, the volatile memory cache circuit is configured to provide a busy signal to the interface circuit through each of the second set of unidirectional serial asynchronous links after receiving a command and before a data element moves through the point-to-point channel. The use of the busy signal enables handshaking, synchronization and coordinated communications between the interface circuit and the volatile memory cache circuit.

In one arrangement, the interface circuit is configured to provide a tag indicator to the volatile memory cache circuit through the first set of unidirectional serial asynchronous links when providing a command to the volatile memory cache circuit. The volatile memory cache circuit is configured to provide a copy of the tag indicator to the interface circuit through the second set of unidirectional serial links when providing status to the interface circuit. The return of the tag indicator enables another level of error detection (e.g., fault recovery), security and coordination of communications between the interface circuit and the volatile memory cache circuit. For example, the volatile memory cache circuit can communicate with multiple interface circuits, and each interface circuit can check the tag indicator of a received communication from the volatile memory cache circuit to confirm that it is the proper recipient of that communication.

In one arrangement, the volatile memory cache circuit provides the data element to the interface circuit ahead of providing the status to the interface circuit. This enables the volatile memory cache circuit to provide the data element to the interface circuit without delay (e.g., as soon as the volatile memory cache circuit receives the data element from another interface circuit). The volatile memory cache circuit can determine whether the data element is valid or invalid (e.g., corrupt based on checksum information) while providing the status. If the data element is valid, the volatile memory cache circuit can indicate, in status fields across status messages, that the data element is valid. However, if the data element is invalid, the volatile memory cache circuit can indicate, in the status fields, that the data element is invalid.

In one arrangement, the interface circuit includes processing circuitry for processing a data element read from the volatile memory cache circuit during the step of moving the data element. In this arrangement, the processing circuitry has the capability to process the read data element while the interface circuit receives the status from the volatile memory. Accordingly, the interface circuit can continue processing the data element in a pipelined manner (e.g., checking the validity of the data element based on checksum information) even before the interface circuit has finished receiving the status.

The features of the invention, as described above, may be employed in data storage systems, devices and methods such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5A is a block diagram of an interface circuit transmission, which includes an access request and a data element, that is suitable for use by the invention.

FIG. 5B is a block diagram of a cache circuit transmission which is suitable for use as a response to the interface circuit transmission of FIG. 5A.

FIG. 6A is a block diagram of another interface circuit transmission which is suitable for use by the invention.

FIG. 6B is a block diagram of another cache circuit transmission, which includes a status message and a data element, that is suitable for use as a response to the interface circuit transmission of FIG. 6A.

DETAILED DESCRIPTION

The invention is directed to techniques for transferring data within a data storage system that includes, among other things, an interconnection mechanism having a point-to-point channel between an interface circuit (e.g., a director) and a volatile memory cache circuit. The point-to-point channel offers the interface circuit and the volatile memory cache circuit contention free access. Such access is superior to the blocking nature of a conventional multi-drop bus topology data storage system. In particular, the contention free access provided by the invention essentially avoids interconnection mechanism delays, e.g., waiting due to other devices using the bus, delays due to bus allocation (e.g., bus arbitration cycles), etc. Additionally, the point-to-point nature of communications between devices of the data storage system (e.g., the interface and volatile memory cache circuits) makes such communication substantially independent of the number of devices within the data storage system thus improving scalability of the data storage system.

Figure 1:
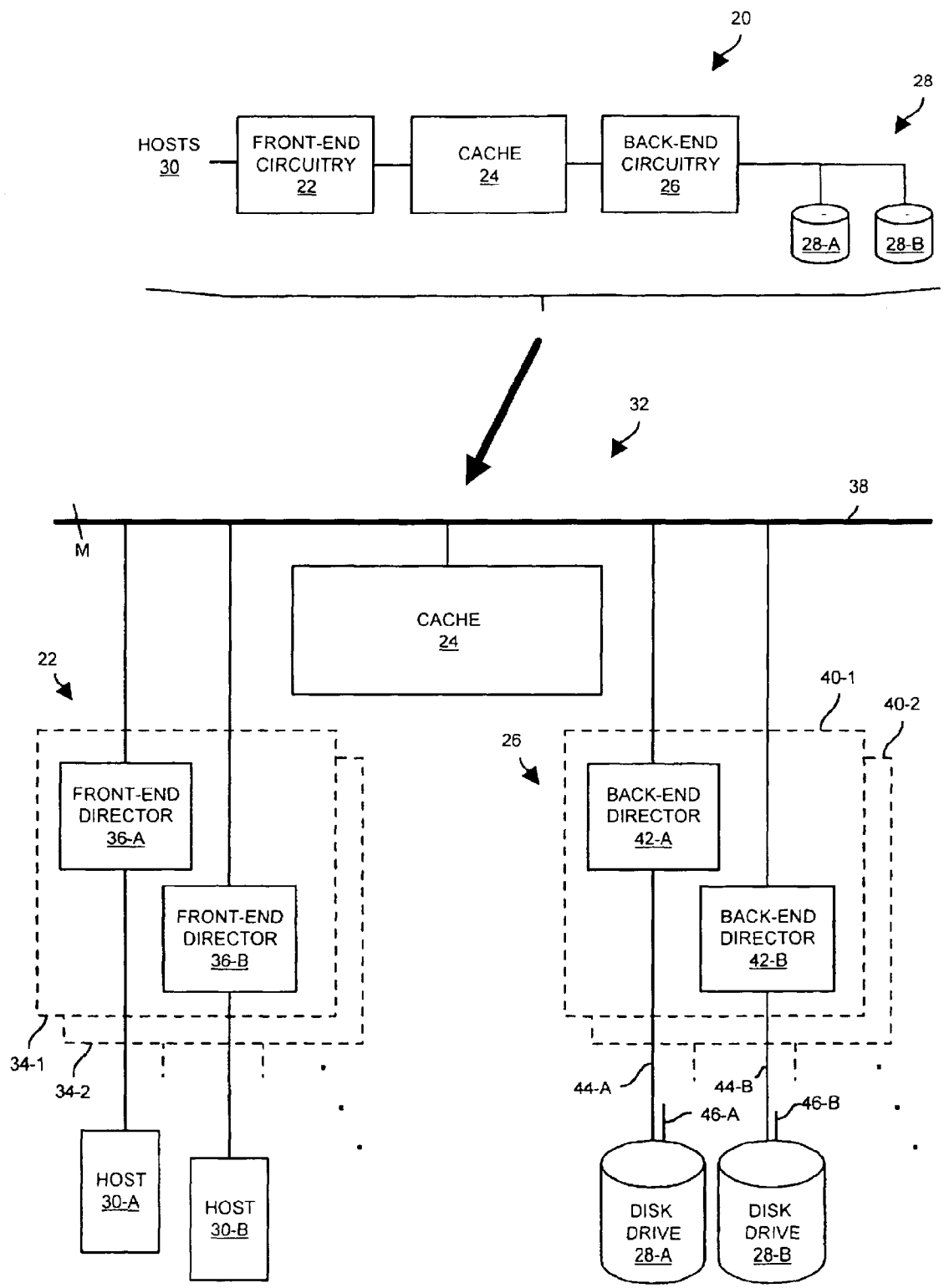
FIG. 1 is a block diagram of a conventional data storage system having a bus that connects a cache with front-end circuitry and back-end circuitry.
Figure 2:
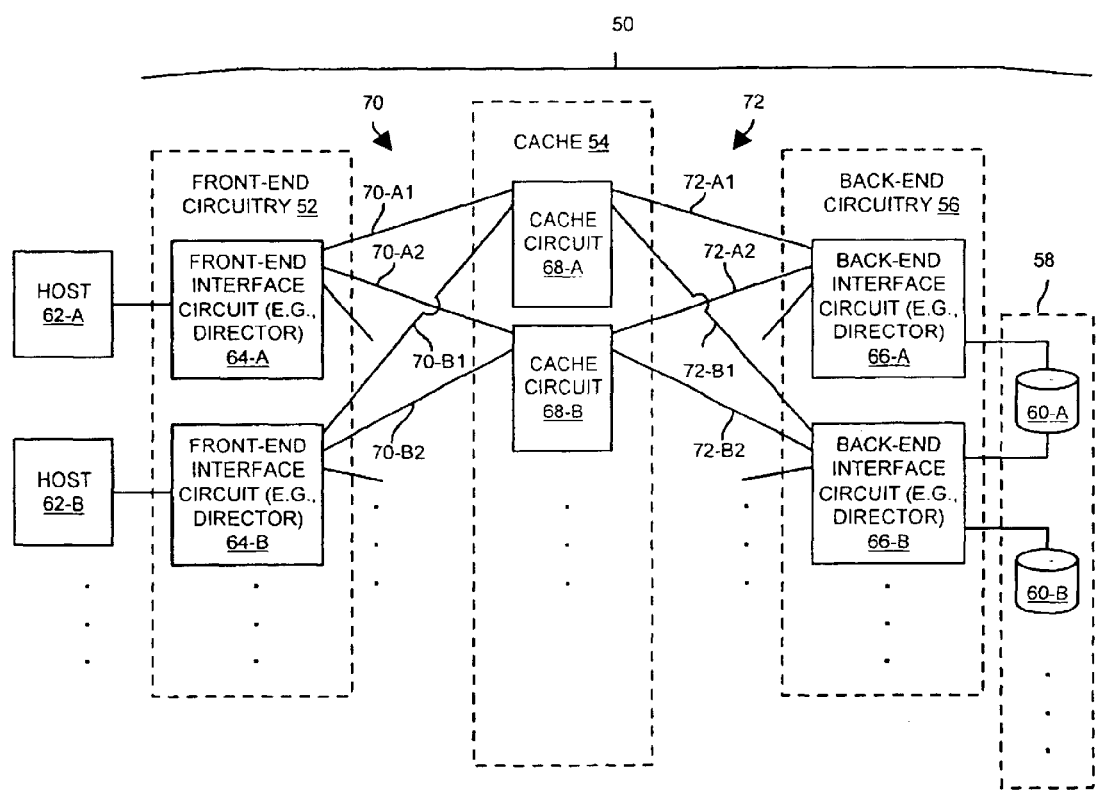
FIG. 2 is a block diagram of a data storage system, which has point-to-point channels that connect a cache with front-end circuitry and back-end circuitry, that is suitable for use by the invention.

FIG. 2 shows a data storage system 50 which is suitable for use by the invention. The data storage system 50 includes front-end circuitry 52, a cache 54, back-end circuitry 56 and a storage assembly 58. The storage assembly 58 includes multiple storage devices 60 (e.g., disk drives for storing data in a non-volatile manner).

The front-end circuitry 52 operates as an interface between hosts 62 and the cache 54. The back-end circuitry 56 operates as an interface between the cache 54 and the storage assembly 58. The cache 54 operates as a buffer for temporarily storing data exchanged between the hosts 62 and the storage assembly 58. For example, the cache 54 is capable of storing data recently read from the storage assembly 58 by a host 62 such that the same host 62, or another host 62, can subsequently access the same data without re-reading that data from the storage assembly 58.

It should be understood that the various circuits 52, 54, 56 include a number of sub-circuits. In particular, the front-end circuitry 52 includes multiple front-end interface circuits 64 (e.g., front-end directors). Each front-end interface circuit 64 (e.g., the front-end interface circuit 64-A) operates as an interface between a particular host 62 (e.g., the host 62-A) and the cache 54. Similarly, the back-end circuit 56 includes multiple back-end interface circuits 66 (e.g., back-end directors). Each back-end interface circuit 66 (e.g., the back-end interface circuit 66-A) operates as an interface between a particular storage device 60 (e.g., the storage device 60-A) and the cache 54.

The cache 54 includes multiple volatile memory cache circuits 68 for buffering data. Each volatile memory cache circuit 68 is capable of operating independently of the other volatile memory cache circuits 68. For example, the volatile memory cache circuit 68-A can transfer data (e.g., write data) from the front-end interface circuit 64-A to the back-end interface circuit 66-A while the volatile memory cache circuit 68-B transfers data (e.g., read data) from the back-end interface circuit 66-B to the front-end interface circuit 64-B.

As shown in FIG. 2, the cache 54 of the data storage system 50 connects to the front-end and back-end interface circuits 64, 66 using a point-to-point topology. In particular, each front-end interface circuit 64 connects to each of the volatile memory cache circuits 68 of the cache 54 through a different point-to-point channel 70. For example, the front-end interface circuit 64-A connects to the volatile memory cache circuit 68-A through a point-to-point channel 70-A1, connects to the volatile memory cache circuit 68-B through a point-to-point channel 70-A2, and so on. Similarly, the front-end interface circuit 64-B connects to the volatile memory cache circuit 68-A through a point-to-point channel 70-B1, connects to the volatile memory cache circuit 68-B through a point-to-point channel 70-B2, and so on.

Furthermore, each back-end interface circuit 66 connects to each of the cache circuits 68 through a different point-to-point channel 72. For example, the back-end interface circuit 66-A connects to the volatile memory cache circuit 68-A through a point-to-point channel 72-A1, connects to the volatile memory cache circuit 68-B through a point-to-point channel 72-A2, and so on. Likewise, the back-end interface circuit 66-B connects to the volatile memory cache circuit 68-A through a point-to-point channel 72-B1, connects to the volatile memory cache circuit 68-B through a point-to-point channel 72-B2, and so on.

It should be understood that each front-end interface circuit 64 preferably has multiple adaptors (or ports) for connecting to multiple hosts 62 and to multiple volatile memory cache circuits 68. Similarly, each back-end interface circuit 66 preferably has multiple adaptors for connecting to multiple storage devices 60 and to multiple volatile memory cache circuits 68. Each volatile memory cache circuit 68 has multiple adaptors for connecting to multiple front-end interface circuits 64 and to multiple back-end interface circuits 66.

It should be further understood that the blocking nature of conventional multi-drop bus architectures and associated deficiencies (e.g., delays due to "lock" and "arbitration" schemes) are not present in the data storage system 50. Rather, the point-to-point channels 70, 72 of the data storage system 50 provide the interface circuits 64, 66 with contention free access to each volatile memory cache circuit 68 for minimal latency and improved scalability (e.g., the latency through a point-to-point channel is independent of scale).

Figure 3:
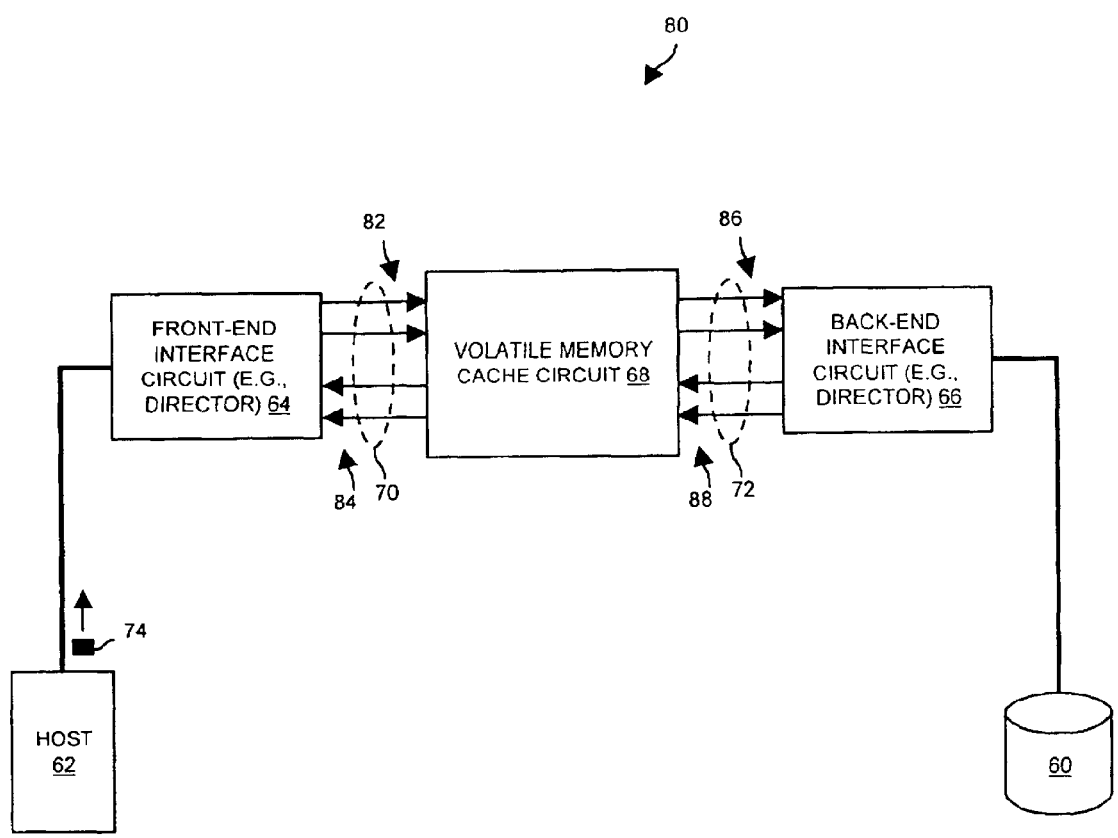
FIG. 3 is a block diagram of a pathway of the data storage system of FIG. 2.

Additionally, it should be understood that the matrix topology of the data storage system 50 preferably provides redundant pathways between each host 62 and each storage device 60 for fault tolerance. FIG. 3 shows a portion 80 of the data storage system 50 which provides such a pathway. If part of the pathway should fail, signals can be redirected through one or more other parts of the data storage system 50 of FIG. 2 in order to maintain communications between the host 62 and the storage device 60 (e.g., transfer of a data element 74 from the host 62 to the storage device 60). Further details of the data storage system 50 will now be provided with reference to FIG. 3.

Each point-to-point channel 70, 72 of the data storage system 50 includes multiple unidirectional links, as shown in FIG. 3 (point-to-point channels 70, 72 illustrated as dashed ovals in FIG. 3). In particular, each point-to-point channel 70 includes two unidirectional asynchronous serial links 82 for carrying signals from a front-end interface circuit 64 to a volatile memory cache circuit 68, and two unidirectional asynchronous serial links 84 for carrying signals in the opposite direction, i.e., from the volatile memory cache circuit 68 to the front-end interface circuit 64. Similarly, each point-to-point channel 72 includes two unidirectional asynchronous serial links 86 for carrying signals from the volatile memory cache circuit 68 to a back-end interface circuit 66, and two unidirectional asynchronous serial links 88 for carrying signals in the opposite direction, i.e., from the back-end interface circuit 66 to the volatile memory cache circuit 68.

The use of asynchronous signals through the channels 70, 72 allows the interface circuits 64, 66 and the volatile memory cache circuits 68 to operate without a global system clock (a potential source of failure). Synchronization of the links in a channel preferably occurs by the circuits at the channel end points (e.g., an interface circuit 64, 66 at one channel end and a volatile memory cache circuit 68 at the opposite channel end) exchanging channel initialization/synchronization signals (e.g., "INIT" signals) with each other through the channel. For example, prior to a channel reaching a ready state (i.e., ready for normal use), the circuit on each end can continue sending, as an INIT signal, an extended sequence of recognizable codes having a healthy number of high/low voltage transitions over each unidirectional asynchronous serial link leading to the circuit on the opposite channel end. As each circuit recognizes receipt of such signals on all of its channel input links, that circuit can then output ready signals (e.g., "READY" signals) in place of outputting synchronization signals. The channel is ready for use when the circuits at each end of the channel no longer exchange synchronization signals, but exchange READY signals. Such signal exchanges enables communications between the circuits without the need for a common clock.

The circuits at the channel end points can exchange other types of signals as well. For example, when a circuit is busy, that circuit can output busy signals (e.g., "BUSY" signals) through its channel output links to notify the circuit at the opposite end of the channel that it is busy or unavailable. As another example, if a circuit becomes confused and provides an unexpected signal through the channel, the circuit at the opposite channel end can attempt to reset the channel communications by outputting alarm/abort signals (e.g., "ALARM" signals) to the confused circuit. Upon receipt of the alarm/abort signals (or reset signals), the confused circuit (if not damaged) can begin reinitialization of the channel by outputting the INIT signals and re-synchronizing with the non-confused circuit, i.e., to bring the channel back up to a ready state. Upon detection of the INIT signals, the circuit outputting the ALARM signals can join the re-synchronization process (e.g., by changing its output to INIT signals as well) before transitioning the channel back to a ready state. Further details of how control information and data are exchanged between a front-end interface circuit 64 and a volatile memory cache circuit 68 will now be provided with reference to FIG. 4.

Figure 4:
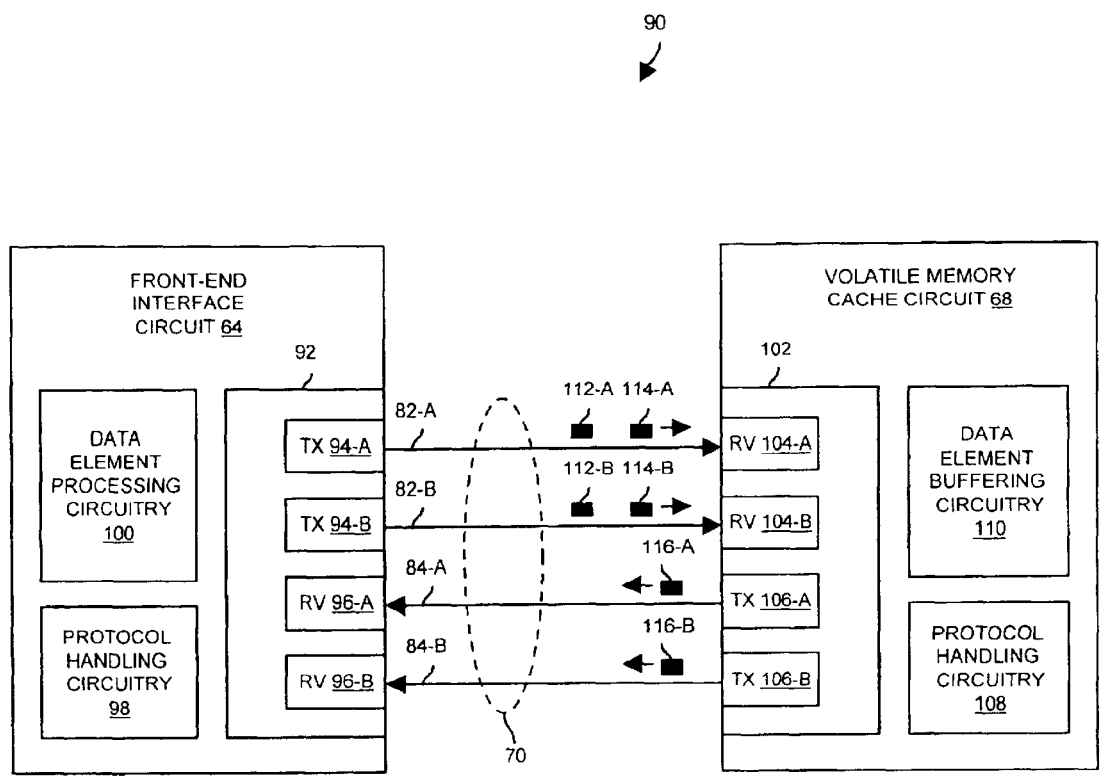
FIG. 4 is a block diagram of further details of a portion of the pathway of FIG. 3.

FIG. 4 shows a detailed view 90 of a front-end interface circuit 64, a volatile memory cache circuit 68, and a point-to-point channel 70 interconnected therebetween. It should be understood that the front-end interface circuit 64 of FIG. 4 connects to other channels 70 leading to other volatile memory cache circuits 68 which are not shown for simplicity. Similarly, it should be understood that the volatile memory cache circuit 68 of FIG. 4 connects to other channels 70, 72 leading to other interface circuits 64, 66 which are not shown for simplicity.

As shown in FIG. 4, the front-end interface circuit 64 includes a transceiver 92 having a first transmitter 94-A for transmitting a first output signal on the link 82-A, a second transmitter 94-B for transmitting a second output signal on the link 82-B, a first receiver 96-A for receiving a first input signal on the link 84-A, and a second receiver 96-B for receiving a second input signal on the link 84-B. The front-end interface circuit 64 further includes protocol handling circuitry 98 and data element processing circuitry 100. The protocol handling circuitry 98 is responsible for implementing a common communications protocol between the front-end interface circuit 64 and the volatile memory cache circuit 68, i.e., lower network layer duties such as data element assembly/disassembly operations, error detection, etc.). The data element processing circuitry 100 processes the data element at a higher level (e.g., the application layer).

As further shown in FIG. 4, the volatile memory cache circuit 68 includes a transceiver 102 having a first receiver 104-A for receiving a first input signal on the link 82-A, a second receiver 104-B for receiving a second input signal on the link 82-B, a first transmitter 106-A for transmitting a first output signal on the link 84-A, and a second transmitter 106-B for transmitting a second output signal on the link 84-B. The volatile memory cache circuit 68 further includes protocol handling circuitry 108 and data element buffering circuitry 110. The protocol handling circuitry 108 is similar to the protocol handling circuitry 98 of the front-end interface circuit 64 in that it implements the communications protocol. The data element buffering circuitry 110 includes volatile storage (e.g., semiconductor memory locations) and control and addressing logic for accessing the volatile storage.

It should be understood that the front-end interface circuit 64 preferably exchanges commands, data and status with the volatile memory cache circuit 68 in a distributed manner. For example, suppose that the front-end interface circuit 64 is about to send a write command and a data element (e.g., a block of data) to the volatile memory cache circuit 68 through the point-to-point channel 70. The data element processing circuitry 100 of the front-end interface circuit 64 provides the write command and the data element to the protocol handling circuitry 98. The protocol handling circuitry 98 distributes both the write command and the data element through the two links 82-A, 82-B to utilize the available bandwidth provided by the two links 82-A, 82-B. For example, as shown in FIG. 4, the front-end interface circuit 64 sends an access request 112-A having the even bytes of the write command, and a data element portion 114-A having the even bytes of the data element through the link 82-A. Additionally, the front-end interface circuit 64 sends another access request 112-B having the odd bytes of the write command, and another data element portion 114-B having the odd bytes of the data element through the link 82-B.

At the other end of the channel 70, the protocol handling circuitry 108 of the volatile memory cache circuit 68 combines the distributed write command portions and data element portions to reform the write command and the data element and then passes both to the data element buffering circuitry 110. The data element buffering circuitry 110 processes the data element based on the write command, and provides status back to the protocol handling circuitry 108. In response, the protocol handling circuitry 108 distributes the status through the two links 84-A, 84-B. For example, as shown in FIG. 4, the volatile memory cache circuit 102 sends a status message 116-A having even status bytes through the link 84-A, and another status message 116-B having odd status bytes through the link 84-B. The protocol handling circuitry 98 and the data element processing circuitry 100 of the front-end interface circuit 64 then recombine and process the status from the two status messages 116-A, 116-B.

It should be understood that the distribution of commands, data and status through multiple channel links in each direction efficiently utilizes the available bandwidth of the channel 70. Further details of communications between the front-end interface circuit 64 and the volatile memory cache circuit 68 will now be provided with reference to FIGS. 5A and 5B.

FIG. 5A shows a format 140 for an access request and a format 142 for a data element portion which are suitable for use by the data storage system 50. That is, the format 140 can be used for each of the access requests 112-A, 112-B of FIG. 4. Similarly, the format 142 can be used for each of the data element portions 114-A, 114-B of FIG. 4.

As shown in FIG. 5A, the format 140 for an access request includes a start-of-file (SOF) field 144, a command field 146, an address field 148, a tag field 150, and an error detection code field 152. The SOF field 144 includes a special delimiter code (e.g., a unique series of bits) that the volatile memory cache circuit 68 recognizes as the beginning of a transmission having the access request format 140 (hereinafter the access request 140 for simplicity). The command field 146 includes a series of codes representing a portion of a command (e.g., even bytes of a write command, even bytes of a read-modify-write command, etc.). The address field 148 includes a portion (e.g., even bytes) of a storage device address for a storage device location upon which the command applies.

The tag field 150 includes part of a tag (e.g., even tag bytes) that the front-end interface circuit 64 includes in the access requests 140 to identify an intended route of communications. For example, and as will be explained in further detail shortly, the tag can identify which front-end interface circuit 64 provides the access requests 140 when multiple front-end interface circuits 64 communicate with the volatile memory cache circuit 68 for fault recovery purposes.

The error detection code field 152 includes an error detection code (e.g., parity, a checksum, etc.) that the volatile memory cache circuit 68 can use to verify proper transmission and reception of the access request 140. In one arrangement, the error detection code utilizes the CRC-CCITT V.41 checksum (i.e., a checksum using the following polynomial: $X^{16}+X^{12}+X^{5}+1$). Other error checking and/or error correction schemes can be used as well (e.g., CRC16, Reed Solomon, etc.).

As further shown in FIG. 5A, the format 142 for a data element portion includes a middle-of-file (MOF) field 154, a data field 156, an error detection code field 158, and an end-of-file (EOF) field 160. The MOF field 154 is similar to an SOF field 144 in that the MOF field 154 includes a special delimiter code that the volatile memory cache circuit 68 recognizes as the beginning of a transmission having the data element portion format 142 (hereinafter simply data element portion 142). In one arrangement, each front-end interface circuit 64 is configured to transmit an access request 140 and a data element portion 142 back-to-back, and each volatile memory cache circuit 68 is configured to locate the end of the access request 140 based on receipt of the MOF delimiter of the data element portion 142. The data field 156 includes a portion of a data element (e.g., even bytes of a data block) to be written to the volatile memory cache circuit 68 and perhaps subsequently to a data storage device 60), or control information (e.g., control parameters, configuration information, etc.). The error detection code field 158 includes an error detection code that the volatile memory cache circuit 68 can use to verify proper transmission and reception of the data element portion 142. The EOF field 160 includes a special delimiter code that the volatile memory cache circuit 68 recognizes as the end of the data element portion 142.

With reference again to FIG. 4, the front-end interface circuit 64 distributes commands and addresses across multiple access requests 112-A, 112-B, and data elements across multiple data element portions 114-A, 114-B. In particular, the front-end interface circuit 64 places even command bytes and even address bytes in the access request 112-A, odd command bytes and odd address bytes in the access request 112-B, even data element bytes in the data element portion 114-A, and odd data element bytes in the data element portion 114-B.

The volatile memory cache circuit 68 can then recombine the contents of the access requests 112-A, 112-B and the data element portions 114-A, 114-B. For example, the volatile memory cache circuit 68 combines the contents of the data fields 156 of the data element portions 114-A, 114-B to form a complete data element (e.g., a complete block of data). Furthermore, the volatile memory cache circuit 68 can determine whether the access requests 140 and the data element portions 142 were properly transmitted and received based on the contents of their error detection code fields 152, 158 (e.g., by looking for a particular remainder such as x1D0F, by generating new checksums and comparing them to checksums in the error detection code fields 152, 158, etc.).

It should be further understood that the transmission through each link 82, 84 is asynchronous and serial thus enabling the links to remain separate and independent, and thus avoiding the need for a system-wide synchronization clock which can be a source of failure. The SOF, MOF and EOF delimiters enable communications to be carried on all links of the channel simultaneously to provide channel alignment and byte synchronization. Accordingly, the front-end interface circuit 64 and the volatile memory cache circuit 68 have a robust handshaking mechanism allowing them to synchronize operation.

FIG. 5B shows a format 170 for a status message which is suitable for use by the data storage system 50. The volatile memory cache circuit 68 of FIG. 4 provides status of a write operation to the front-end interface circuit 64 by distributing the status across multiple status messages sent through the links 84-A, 84-B. In particular, the status message 116-A includes half of the status (e.g., even status bytes), and the status message 116-B includes the other half of the status (e.g., odd status bytes).

As shown in FIG. 5B, the format 170 for a status message includes an MOF field 172, a tag field 174, a fill field 176, a status field 178, an error detection code field 180, and an end-of-file field 182. The MOF field 172 includes a special delimiter code that the front-end interface circuit 64 recognizes as the beginning of a transmission having the status message format 170 (hereinafter simply a status message 170).

The tag field 174 includes a portion of a tag (e.g., even tag bytes) that the front-end interface circuit 64 included in the earlier sent access request 140 in order to enable the front-end interface circuit 64 to associate the status message 170 with a particular front-end interface circuit 64. For example, with reference to FIG. 2, suppose that the front-end interface circuit 64-A provides a write command and a data element to the volatile memory cache circuit 68-A. The front-end interface circuit 64-A distributes the write command and the data element within access requests and data element portions having the formats 140, 142 of FIG. 5A, and sets the tag fields 150 of the access requests to include a tag identifying the front-end interface circuit 64-A as the originator or source of the write command and the data element. In response, the volatile memory cache circuit 68-A processes the write command and the data element, and provides status back to the front-end interface circuit 68-A. In particular, the volatile memory cache circuit 68-A distributes the status within status messages having the format 170 of FIG. 5B, and includes the tag portions of the earlier-received access requests in the tag fields 174 of the status messages (e.g., even tag bytes in the tag field 150 of one status message, and the odd tag bytes in the tag field 150 of another status message). Next, the front-end interface circuit 64-A combines the tag portions to reform the tag and confirms that the status messages have been sent to the correct front-end interface circuit 64, i.e., the front-end interface circuit 64-A, by checking the tag. If the volatile memory cache circuit 68-A had inadvertently sent the status message to the front-end interface circuit 64-B, i.e., the wrong interface circuit, the front-end interface circuit 64-B would determine that it was improperly sent the status message by checking the tag, and initiate an appropriate error handling routine.

With reference back to FIG. 5B, the fill field 176 includes codes that extend the size of the status message 170 in order to provide processing flexibility (e.g., to delay the completion of transmission of the status message 170 until the volatile memory cache circuit 68 can complete the write operation and generate the status message 170). The status field 178 includes part of the status provided by the volatile memory cache circuit 68 in response to an earlier command, e.g., even bytes or odd bytes of status indicating whether the earlier-performed write operation completed properly. The error detection code field 180 is similar to the error detection code fields 152, 158 of FIG. 5A in that the error detection code field 180 includes an error detection code that the front-end interface circuit 64 can use to verify proper transmission and reception of the status message 170. The EOF field 182 includes a special delimiter code that the front-end interface circuit 64 recognizes as the end of the status message 170. Further details of communications between the front-end interface circuit 64 and the volatile memory cache circuit 68 will now be provided with reference to FIGS. 6A and 6B.

FIG. 6A shows a format 190 for an access request which is suitable for use by the data storage system 50. The front-end interface circuit 64 provides a transmission having the access request format 190 (hereinafter access request 190) to the volatile memory cache circuit 68 through each link 82 (see FIG. 4) when reading a data element from the volatile memory cache circuit 68. The access request 190 includes a start-of-file (SOF) field 192, a command field 194, an address field 196, a tag field 198, and an error detection code field 200. The SOF field 192 includes a special delimiter code that the volatile memory cache circuit 68 recognizes as the beginning of the access request. The command field 194 includes a series of codes representing a portion of a command (e.g., even bytes of a read command). The address field 196 includes a portion (e.g., even bytes) of a storage device address for a storage device location upon which the command applies. The tag field 198 includes a series of codes that the front-end interface circuit 64 includes in the access request 190 to distinguish it from access requests of other front-end interface circuits 64. The error detection code field 200 includes an error detection code (e.g., parity, a checksum, etc.) that the volatile memory cache circuit 68 can use to verify proper transmission and reception of the access request 190.

The tag field 198 includes part of a tag (e.g., even tag bytes) that the front-end interface circuit 64 includes in the access requests 190 to identify an intended route of communications. For example, as explained above, the tag field 198 can include a part of a tag that identifies which front-end interface circuit 64 provided the access request 190 (for fault recovery purposes) when multiple front-end interface circuits 64 communicate with the volatile memory cache circuit 68.

The error detection code field 200 includes an error detection code (e.g., parity, a checksum, etc.) that the volatile memory cache circuit 68 can use to verify proper transmission and reception of the access request 190. The EOF field 202 includes a special delimiter code that the volatile memory cache circuit 68 recognizes as the end of the status message 190. In one arrangement, the volatile memory cache circuit 68 distinguishes an access request 140 and an access request 190 based on the next received end delimiter (i.e., MOF for the access request 140 and EOF for the access request 190).

As explained earlier, the front-end interface circuit 64 distributes commands, addresses and tags across multiple access requests, e.g., see access requests 112-A, 112-B of FIG. 4. In particular, the front-end interface circuit 64 places even command bytes, even address bytes and even tag bytes in the access request 112-A, and odd command bytes, odd address bytes and odd tag bytes in the access request 112-B. The volatile memory cache circuit 68 can then combine the contents of the command fields 194, the address fields 196 and tag fields 198 of the access requests to form a complete command, a complete address and a complete tag. Additionally, the volatile memory cache circuit 68 can determine whether the access requests were properly transmitted and received based on the contents of the error detection code field 200.

FIG. 6B shows a format 210 for a data element portion and a format 212 for a status message which are suitable for use by the data storage system 50. The volatile memory cache circuit 68 provides transmissions having the data element portion format 210 (hereinafter data element portions 210) and transmissions having the status message format 212 (hereinafter status messages 212) to the front-end interface circuit 64 through the links 84-A, 84-B (see FIG. 4) in response to a read operation by the front-end interface circuit 64. The data element portion 210 includes a start-of-file (SOF) field 214, a data field 216, and an error detection code field 218. The SOF field 214 is includes a special delimiter code that the front-end interface circuit 64 recognizes as the beginning of a data element portion. The data field 216 includes a portion of a data element (e.g., even bytes or odd bytes of the data element) read from the volatile memory cache circuit 68 (an perhaps a data storage device 60). The error detection code field 218 includes an error detection code that the front-end interface circuit 64 can use to verify proper transmission and reception of the data element portion 210.

As further shown in FIG. 6B, the status message 212 includes an MOF field 220, a tag field 222, a fill field 224, a status field 226, an error detection code field 228, and an end-of-file field 230. The MOF field 220 includes a special delimiter code that the front-end interface circuit 64 uses to recognize the beginning of the status message 212 and the end of the data element portion 210 (i.e., the MOF field 220 bounds the data element portion 210). The tag field 222 includes a portion of a tag (e.g., even tag bytes) that the front-end interface circuit 64 included in the tag fields 198 of access requests 190 (see FIG. 6A) to enable the front-end interface circuit 64 to verify that it is the correct recipient of the data element portion 210 and the status message 212. If the front-end interface circuit 64 receives status with a tag identifying another front-end interface circuit 64 as the intended recipient, the front-end interface circuit 64 can begin an error handling routine (e.g., notify the volatile memory cache circuit 68 that the status has been misrouted).

The fill field 224 includes codes that extend the size of the status message in order to provide processing flexibility. For example, the volatile memory cache circuit 68 of FIG. 4 can include fill codes in the fill field 224 to delay the completion of transmission of the status message 212 until the volatile memory cache circuit 68 can complete the read operation (e.g., error check the data element which was read from a storage device) and generate proper status.

The status field 226 includes a portion of the status (e.g., even status bytes) indicating whether the earlier performed read operation completed properly. The error detection code field 228 includes an error detection code that the front-end interface circuit 64 can use to verify proper transmission and reception of the status message 212. The EOF field 230 includes a special delimiter code that the front-end interface circuit 64 recognizes as the end of the status message 212.

When the front-end interface circuit 64 reads a data element from the volatile memory cache circuit 68 (see FIG. 4), the volatile memory cache circuit 68 transmits a first data element portion and a first status message on the link 84-A, and a second data element portion and a second status message on the link 84-B. In particular, the volatile memory cache circuit 68 places even data element bytes in the first data element portion and even status bytes in the first status message on link 84-A, and odd data element bytes in the second data element portion and odd status bytes in the second status message on the link 84-B. The front-end interface circuit 64 can then combine the portions of the data element and the status to reform the data element (e.g., a block of data) and the status. Furthermore, the front-end interface circuit 64 can determine whether the communications were properly transmitted and received based on the contents of the error detection code fields 218, 228 (also see FIGS. 6A and 6B).

It should be understood that the codes of the access requests 140, 190, the data element portions 142, 210, and the status messages 170, 212 have a standard format that is recognizable at both ends of the point-to-point channel 70. Preferably, the codes comply with an 8B/10B encoding/decoding convention for robust error checking. The special attributes of 8B/10B encoding (e.g., limitations to the number of ones and zeros within each code, distinctions between special control codes and data codes, the use of special bit sequences such as a comma, the use of a running disparity, etc.) enable a level of control to be passed with the information of each code. For example, the ends of the point-to-point channel 70 can perform extensive error detection routines to uncover practically all errors. This is a powerful feature since the point-to-point channels 70 (as well as the point-to-point channels 72) when implemented within the data storage system 50 (e.g., within a backplane or multiple backplanes) can be a source of message distortion (e.g., information loss due to bit distortion). Preferably, control characters from the 8B/10B control space are reserved for particular fields such as the SOF, MOF and EOF delimiters, and the data characters from the 8B/10B data space are used in other fields such as the data fields 156, 216 (see FIGS. 5A, 5B, 6A and 6B). Furthermore, particular control characters (hereinafter referred to as semaphores) are used to report conditions or invoke control (e.g., K28.5/K28.5/D10.2 can be used as a ready signal, K28.5/K28.5/D21.4 can be used as a busy signal, and so on). Accordingly, the use of 8B/10B codes enables control and conveyance of additional information (e.g., delimiters), and provides an additional level of error detection. A device which is suitable for use to implement the above-described 8B/10B encoding mechanism is the VSC7216 provided by Vitesse Semiconductor Corporation of Camarillo, Calif.

Additionally, it should be understood that the volatile memory cache circuit 68 preferably provides the data element to the front-end interface circuit 64 ahead of providing the status message to the front-end interface circuit 64 (see FIGS. 6A and 6B). This enables the volatile memory cache circuit 68 to provide the data element to the front-end interface circuit 64 without delay (e.g., as soon as the volatile memory cache circuit 68 receives the data element from a back-end interface circuit 66). The volatile memory cache circuit 68 can then determine whether the data element is valid or invalid (e.g., corrupt based on the contents of the error detection code field 218) as the data element passes through to the front-end interface circuit 64. The volatile memory cache circuit 68 then provides status in status messages 212 (i.e., even status bytes in one status message 212, and odd status bytes in another status message) to indicate whether the data element is valid or invalid.

Furthermore, when the volatile memory cache circuit 68 provides the data element to the front-end interface circuit 64 ahead of providing the status message to the front-end interface circuit 64, the data element processing circuitry 120 of the front-end interface circuit 64 preferably is capable of processing that data element read while the transceivers 112 and the protocol handling circuitry 98 of the front-end interface circuit 64 receive the status messages 212 from the volatile memory cache circuit 68 and determine whether there were any errors. If there were errors, the protocol handling circuitry 98 can notify the data element processing circuitry 100. Accordingly, the front-end interface circuit 64 can continue processing the data element in a pipelined manner (e.g., checking the validity of the data element based on checksum information) even before the front-end interface circuit 64 has finished receiving the status message 212.

As just described above, the front-end interface circuit 64 is preferably configured to expect receipt of data element portions 210 ahead of status messages 212. The front-end interface circuit 64 can detect a deviation of this protocol as an error. For example, if the front-end interface circuit 64 receives the MOF delimiter (the beginning of a status message) as the beginning of a response from the volatile memory cache circuit 68 in response to a read command (rather than an SOF delimiter which is the beginning of a data element portion), the front-end interface circuit 64 knows that an error has occurred, and can then perform an error handling routine.

It should be understood that, although a write operation and a read operation have been described above, other operations (e.g., configuration operations, administrative operations, etc.) can be performed as well. Preferably, the data storage system 50 supports read-modify-write operations. For example, suppose that the front-end interface circuit 64 of FIG. 4 needs to add a particular value to an original data element residing in the volatile memory cache circuit 68. The front-end interface circuit 64 can send a read-modify-write command and the value (as a data element) to the volatile memory cache circuit 68 in form of access requests 140 and data element portions 142, respectively (see FIG. 5A). The volatile memory cache circuit 68 responds by adding the value to the original data element residing in the volatile memory cache circuit 68, and sending a copy of the original data element and status to the front-end interface circuit 64 in the form of data element portions 210 and status messages 212, respectively (see FIG. 6B). Preferably, the volatile memory cache circuit 68 treats the read-modify-write operation as an atomic operation (i.e., prevents another data access operation from occurring during the read-modify-write operation to avoid inadvertently overwriting the results of the other data access operation).

It should be further understood that the above-described explanations pertaining to FIG. 4 were directed to communications between the front-end interface circuit 64 and the volatile memory cache circuit 68 through the point-to-point channel 70 by way of example only. The same explanations apply to communications between the volatile memory cache circuit 68 and a back-end interface circuit 66 (see FIG. 3) through a point-to-point channel 72. For example, the back-end interface circuit 66 of FIG. 3 (i) can write a data element to the volatile memory cache circuit 68 by providing access requests 140 and data element portions 142 (see FIG. 5A) through the links 88 of the point-to-point channel 72, and (ii) can receive status messages 170 from the volatile memory cache circuit 68 through the links 86 of the point-to-point channel 72. Additionally, the back-end interface circuit 66 can read a data element from the volatile memory cache circuit 68 by providing access requests 190 (see FIG. 6A) through the links 88 of the point-to-point channel 72, and receiving data element portions 210 and status messages 212 from the volatile memory cache circuit 68 through the links 86 of the point-to-point channel 72. A summary of how a front-end interface circuit 64 performs certain operations will now be provided with reference to FIG. 7.

Figure 7:
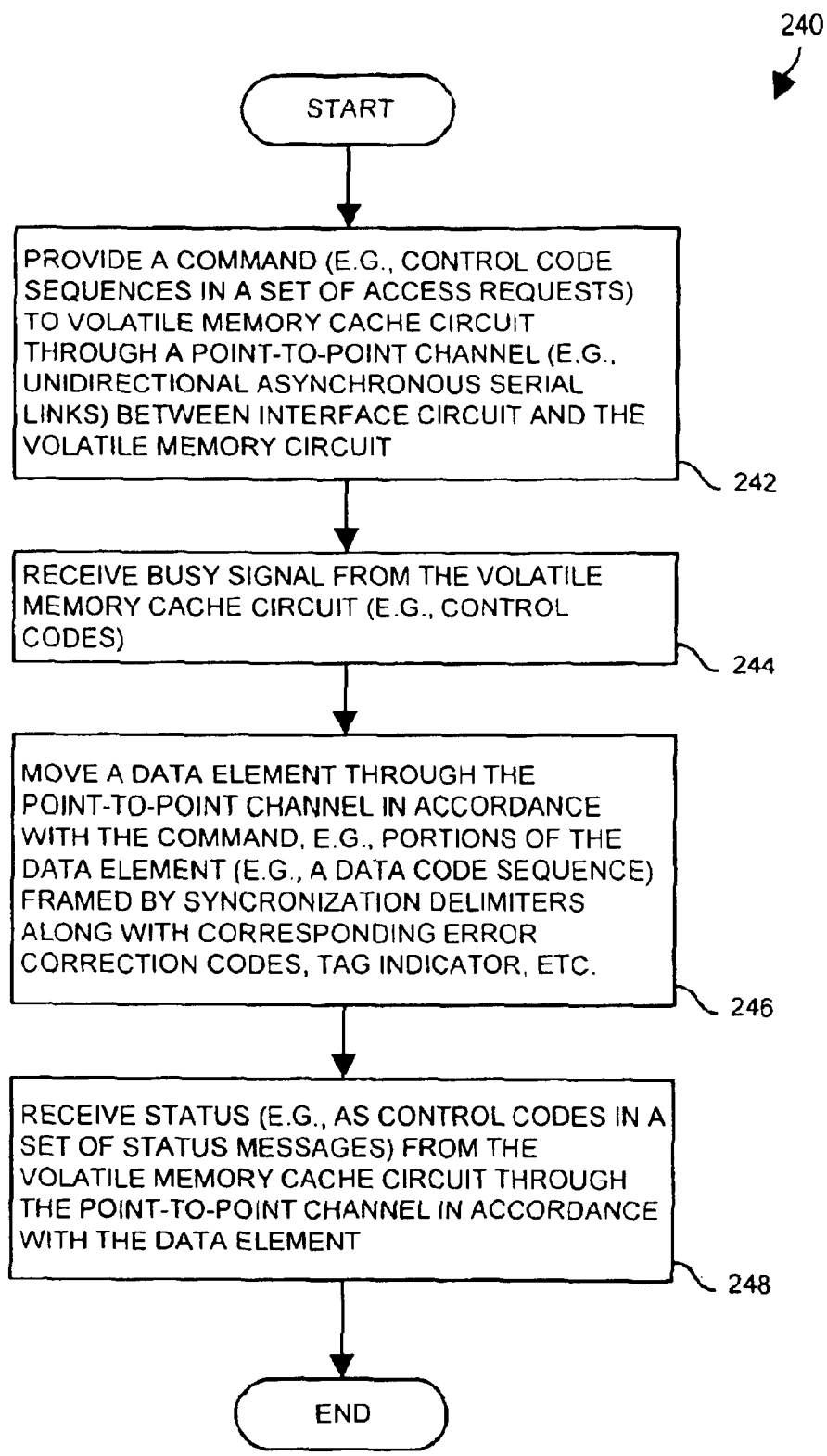
FIG. 7 is a flow chart of a procedure performed by an interface circuit of a data storage system when exchanging data with a volatile memory cache circuit.

FIG. 7 shows a procedure 240 which is performed by a front-end interface circuit 64 during a data access operation (e.g., writing a data element to the cache, reading a data element from the cache, etc.). In step 242, the front-end interface circuit 64 provides a command (e.g., a sequence of 8B/10B control codes) to the volatile memory cache circuit 68 (e.g., see the access requests 112-A, 112-B of FIG. 4). Preferably, the command is striped across multiple access requests (e.g., even command bytes in one access request, and odd command bytes in another).

In step 244, the front-end interface circuit 64 receives BUSY signals from the volatile memory cache circuit 68 through the links 84-A, 84-B in response to the command. In one arrangement, each BUSY signal is a sequence of 8B/10B codes (e.g., 8B/10B control codes with a relatively high number of zero and one transitions in order to keep the links active). Recall that the BUSY signal is one of several signals that enable the circuits at the channel end points to handshake (e.g., coordinate operating states, synchronize/align links of the point-to-point channel 70, etc.).

In step 246, the front-end interface circuit 64 moves a data element through the point-to-point channel 70 in accordance with the access request. For example, if the command was a write request, the front-end interface circuit 64 provides a data element (e.g., data element portions through respective links 82 of the point-to-point channel 70) to the volatile memory cache circuit 68 in step 246. On the other hand, if the command was a read request, the front-end interface circuit 64 receives a data element (e.g., data element portions through respective links 84 of the point-to-point channel 70) from the volatile memory cache circuit 68 in step 246. Recall that preferably the even bytes of the data element pass through one link, and the odd bytes of the data element pass through another link. In one arrangement, the data element portions include sequences of 8B/10B data codes which are framed by control codes (synchronization delimiters, error correction codes, tags, etc. as shown in FIGS. 5A and 6B).

In step 248, the front-end interface circuit 64 receives status from the volatile memory cache circuit 68 in accordance with the data element. For example, the front-end interface circuit 64 receives status indicating the results of a write operation in response to a write command, the results of a read operation in response to a read command, etc. The status is preferably distributed across multiple status messages (e.g., see status messages 116-A, 116-B in FIG. 4). In one arrangement, status includes 8B/10B control codes. A summary of the operation of a volatile memory cache circuit 68 will now be provided with reference to FIG. 8.

Figure 8:
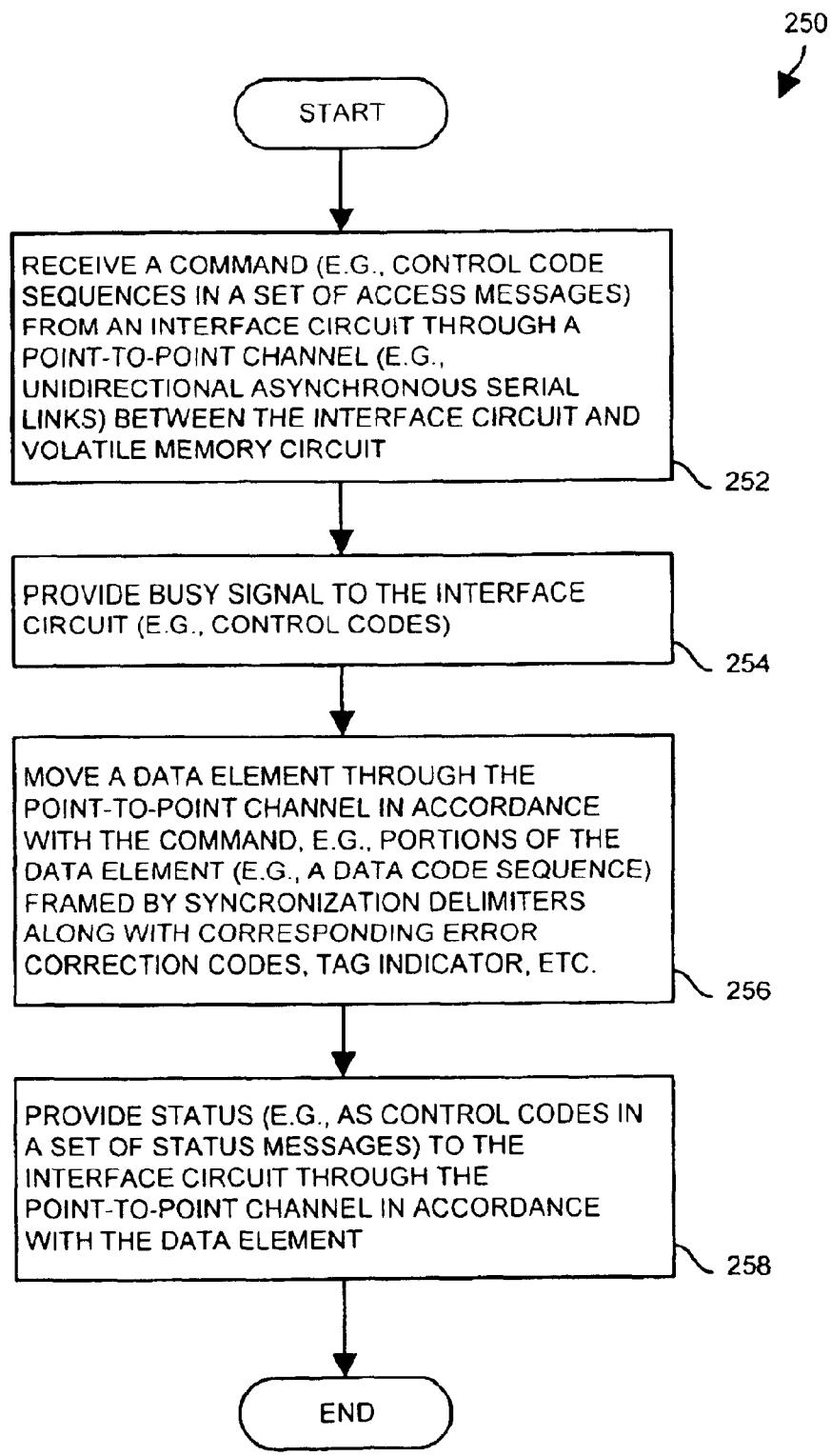
FIG. 8 is a flow chart of a procedure performed by a volatile memory cache circuit of a data storage system when exchanging data with an interface circuit to one of a host and a storage device.

FIG. 8 shows a procedure 250 which is performed by a volatile memory cache circuit 68 during a data access operation (e.g., receiving a data element into the cache, providing a data element from the cache, etc.). In step 252, the volatile memory cache circuit 68 receives a command (e.g., a sequence of 8B/10B control codes) from the front-end interface circuit 64 (e.g., the access requests 112-A, 112-B of FIG. 4).

In step 254, the volatile memory cache circuit 68 provides a BUSY signal to the front-end interface circuit 64 through the links 84-A, 84-B of a point-to-point channel 70 in response to the command.

In step 256, the volatile memory cache circuit 68 moves a data element through the point-to-point channel 70 in accordance with the command. For example, if the command was a write command, the volatile memory cache circuit 68 receives a data element (e.g., even bytes and odd bytes through respective links 82 of the point-to-point channel 70) from the front-end interface circuit 64 in step 246. On the other hand, if the command was a read command, the volatile memory cache circuit 68 provides a data element (e.g., even bytes and odd bytes through respective links 84 of the point-to-point channel 70) to the front-end interface circuit 64 in step 246. In one arrangement, the parts of the data element include sequences of 8B/10B data codes which are framed by control codes (synchronization delimiters, error correction codes, tags, etc. as shown in FIGS. 5A and 6B).

In step 258, the volatile memory cache circuit 68 provides status to the front-end interface circuit 64 in accordance with the data element. For example, the volatile memory cache circuit 68 includes status indicating the results of a write operation in response to a write command, the results of a read operation in response to a read command, etc. The status is preferably distributed across multiple status messages (e.g., see status messages 116-A, 116-B in FIG. 4). In one arrangement, the status message includes 8B/10B control codes.

It should be understood that the procedure 240 of FIG. 7 and the procedure 250 of FIG. 8 were described as handling communications between the front-end interface circuit 64 and the volatile memory cache circuit 68 by way of example only. The procedure 240 of FIG. 7 is also performed by the back-end interface circuits 66 in order to move data elements between the volatile memory cache circuits 68 and the storage devices 60. Similarly, the procedure 250 of FIG. 8 is also performed by the volatile memory cache circuits 68 in order to move the data elements between the volatile memory cache circuits 68 and the storage devices 60.

Furthermore, it should be understood that for read-modify-write operations, data elements move in both directions. For example, the front-end interface circuit 64 of FIG. 4 provides a data element to the volatile memory cache circuit 68 (i.e., a value to add to an original data element), and the volatile memory cache circuit 68 returns a data element (i.e., the original data element).

As described above, the invention is directed to techniques for transferring data (e.g., a data element) within a data storage system 50 that includes, among other things, an interconnection mechanism having a point-to-point channel 70, 72 between an interface circuit 64, 66 and a volatile memory cache circuit 68. The point-to-point channel 70, 72 allows the interface circuit 64, 66 and the volatile memory cache circuit 68 to have contention free access to each other.

Such access is superior to the blocking nature of the conventional bus topology data storage system. In particular, the contention free access provided by the invention essentially alleviates interconnection mechanism delays, e.g., delays due to other devices using the bus, delays due to bus allocation (e.g., bus arbitration cycles), etc. Furthermore, the point-to-point nature of communications between devices of the data storage system (e.g., the interface and volatile memory cache circuits) essentially makes such communication independent of the number of devices within the data storage system thus improving scalability of the data storage system.

The features of the invention may be particularly useful in data storage systems and computer-related circuits (e.g., fault-tolerant systems) such as those of EMC Corporation of Hopkinton, Mass. For example, the invention can be implemented in computer equipment arranged in a storage area network (SAN) configuration. As another example, the invention can be implemented in computer equipment arranged in a network-attached storage (NAS) configuration. As a particular example, the invention can be implemented in a Symmetrix, which is manufactured by EMC Corporation.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the data storage system 50 is shown in FIG. 2 as including only two front-end interface circuits 64, two volatile memory cache circuits 68 and two back-end interface circuits 66 by way of example only. In other arrangements, the data storage system 50 includes different numbers of front-end interface circuits 64, volatile memory cache circuits 68 and back-end interface circuits 66. Regardless of the number of circuits, it should be understood that the point-to-point channels 70, 72 provide contention free access thus freeing the data storage system 50 of interconnection mechanism contention delays to provide full flexibility when scaling the data storage system 50.

Additionally, it should be understood that the point-to-point channels 70, 72, were shown as including two input links and two output links by way of example only. In other arrangements, the point-to-point channels 70, 72 include a different number of links in each direction (e.g., one, eight, etc.). As the number of links increase (e.g., to increase bandwidth), the front-end interface circuits 64 and the back-end interface circuits 66, which are essentially interfaces to the volatile memory cache 54 (see FIG. 2), can distribute portions of a data element across more links thus enabling the same amount of data to be transferred in a shorter amount of time, or a larger amount of data to be transferred in the same amount of time.

Furthermore, it should be understood that the above-described communications protocol between the interface circuits 64, 66 and the volatile memory cache circuits 68 are suitable for a variety of operations including read, write and read-modify-write (i.e., mask/compare/swap) data transfer operations. In one arrangement, the read-modify-write operation is made atomic thus preventing the operation from being interrupted until complete.

Additionally, it should be understood that the interface circuits 64, 66 and the volatile memory cache circuits 68 can exchange signals other than data transfer communications through the point-to-point channels 70, 72. For example, upon startup, the interface circuits 64, 66 and the volatile memory cache circuits 68 can exchange INIT and subsequently READY signals (e.g., repeating 8B/10B control characters to allow the circuits to align their operating states and synchronize links). In particular, the circuits can exchange semaphores to report conditions (e.g., operating states) and invoke control. If an error occurs during communications (e.g., bit errors, timeouts, loss of synchronization, etc.) the interface circuits 64, 66 and the volatile memory cache circuits 68 use ALARM signals (e.g., another series of 8B/10B control characters), exchange semaphores, or in the worst case, reset themselves and/or restart communications through the point-to-point channels 70, 72 beginning with a new series of synchronization and ready signals.

Furthermore, the tags fields 150, 174, 198, 222 were described as including an identification of which interface circuit initiated an operation for fault recovery purposes. It should be understood that the tag fields can contain other information as well (e.g., a complete blue print or map of the communications pathway for an operation). Also, it should be understood that the volatile memory cache circuit 68 can send a special identifier in a tag field (e.g., zero out the tag field) if the volatile memory cache circuit 68 determines that the contents of the tag are faulty or corrupt so that the interface circuit 64, 66 does not mistakenly believe it is not the correct recipient.

Additionally, it should be understood that the above-described communications between interface circuits 64, 66 and the volatile memory cache circuits 68 can include commands and data with varying degrees of complexity (e.g., complex read and writes with different addressing schemes). For example, the data portions sent through the channels 70, 72 can include addresses to other data elements rather than actual data, test-and-set commands for locking purposes, etc.

Furthermore, it should be understood that the interface circuits 64, 66 were described as being the initiators of operations with the volatile memory cache circuits 68 by way of example only. In other arrangements, the volatile memory cache circuits 68 have the ability to initiate operations as well.

What is claimed is:

1. In an interface circuit of a data storage system, a point-to-point channel directly connecting to both the interface circuit and a volatile memory cache circuit, a method for exchanging data with the volatile memory cache circuit, the method comprising the steps of:

providing a command to the volatile memory cache circuit through the point-to-point channel which directly connects to both the interface circuit and the volatile memory cache circuit, the point-to-point channel including a first link and a second link;

dividing a data element into a first half of the data element and a second half of the data element;

moving the data element through the point-to-point channel in accordance with the command, the step of moving including the step of conveying the first half of the data element through the first link and the second half of the data element through the second link, the step of conveying including the step of transmitting the first half of the data element from a first transmitter and concurrently transmitting the second half of the data element from a second transmitter; and receiving status from the volatile memory cache circuit through the point-to-point channel in accordance with the data element.

2. The method of claim 1 wherein the first and second links form a set of unidirectional links that carries signals from the interface circuit to the volatile memory cache circuit, and wherein the step of providing the command to the volatile memory cache circuit includes the step of:
  sending the command to the volatile memory cache circuit through the set of unidirectional links of the point-to-point channel.

3. The method of claim 2 wherein the point-to-point channel further includes another set of unidirectional links that carries signals from the volatile memory cache circuit to the interface circuit, and wherein the step of receiving status from the volatile memory cache circuit includes the step of:
  obtaining the status from the volatile memory cache circuit through the other set of unidirectional links of the point-to-point channel.

4. The method of claim 1 wherein the first link and the second link form a first set of unidirectional serial links that carries signals from the interface circuit to the volatile memory cache circuit, and a second set of unidirectional serial links that carries signals from the volatile memory cache circuit to the interface circuit; and wherein the step of moving the data element includes the steps of:
  sending the data element to the volatile memory cache circuit through the first set of unidirectional serial links when the command indicates a write transaction; and
  obtaining the data element from the volatile memory cache circuit through the second set of unidirectional serial links when the command indicates a read transaction.

5. The method of claim 4 wherein each of the first set of unidirectional serial links and each of the second set of unidirectional serial links is an asynchronous link; wherein the step of sending includes the step of:
  outputting a respective portion of the data element framed with synchronization delimiters to the volatile memory cache circuit through each of the first set of unidirectional serial links when the command indicates a write transaction; and
wherein the step of obtaining includes the step of:
  inputting a respective portion of the data element framed with synchronization delimiters from the volatile memory cache circuit through each of the second set of unidirectional serial links when the command indicates a read transaction.

6. The method of claim 4 wherein the step of sending includes the step of:
  outputting a respective portion of the data element and a corresponding multiple bit error detection code to the volatile memory cache circuit through each of the first set of unidirectional serial links when the command indicates a write transaction; and
wherein the step of obtaining includes the step of:
  inputting a respective portion of the data element and a corresponding multiple bit error detection code from the volatile memory cache circuit through each of the second set of unidirectional serial links when the command indicates a read transaction.

7. The method of claim 4 wherein the step of sending includes the step of:
  outputting portions of the data element as data codes through the first set of unidirectional serial links when the command indicates a write transaction;
wherein the step of obtaining includes the step of:
  inputting portions of the data element as data codes through the second set of unidirectional serial links when the command indicates a read transaction; and wherein the data codes belong to an 8B/10B encoding/decoding data space.

8. The method of claim 4, further comprising the step of:
  receiving a busy signal from the volatile memory cache circuit through each of the second set of unidirectional serial links after the step of providing the command and before the step of moving the data element.

9. The method of claim 4 wherein the step of providing the command includes the step of:
  sending a tag indicator to the volatile memory cache circuit through the first set of unidirectional serial links; and
wherein the step of receiving the status includes the step of:
  obtaining a copy of the tag indicator from the volatile memory cache circuit through the second set of unidirectional serial links.

10. The method of claim 1 wherein the step of moving the data element through the point-to-point channel includes the step of:
  reading the data element from the volatile memory cache circuit; and
wherein the method further comprises the step of:
  processing the read data element within the interface circuit during the step of receiving status from the volatile memory cache circuit.

11. The method of claim 1, further comprising the step of:
  prior to transmitting the first half of the data element and the second half of the data element, associating a tag within each of the first half of the data element and the second half of the data element so that the tag passes through each of the first link and the second link of the point-to-point channel, the tap being adapted to persist within a subsequent status message to indicate whether communications occurred between a correct interface and volatile memory cache circuits.

12. The method of claim 11 wherein the point-to-point channel further includes a third link and a fourth link, and wherein the step of receiving the status through the point-to-point channel includes the step of:
  obtaining (i) a first half of a status message through the third link, and (ii) a second half of the status message through the fourth link, the first half of the status message having a copy of the tag associated with the first half of the data element and the second half of the status message having a copy of the tag associated with the second half of the data element to enable the interface circuit to verify transmission of the status message to a correct interface circuit among multiple interface circuits.

13. The method of claim 1 wherein the step of providing a command to the volatile memory cache circuit includes the step of:
  sending the command through the point-to-point channel for immediate processing by the volatile memory cache circuit at an end of the point-to-point channel.

14. The method of claim 13 wherein the volatile memory cache circuit combines with other volatile memory cache circuits to form a cache which is disposed between other interface circuits and non-volatile disk storage; and wherein the steps of providing, moving and receiving occur concurrently with exchanging of data through other point-to-point channels which directly connect the other interface circuits and the cache.

15. The method of claim 1 wherein the data element includes a series of even and odd numbered bytes; and wherein the step of dividing the data element into the first half and the second half includes the step of:

putting all of the even numbered bytes of the series into the first half to enable the first transmitter to exclusively transmit only even numbered bytes through the first link of the point-to-point channel; and putting all of the odd numbered bytes of the series into the second half to enable the second transmitter to exclusively transmit only odd numbered bytes through the second link of the point-to-point channel.

16. The method of claim 15 wherein transmission of the first half of the data element and transmission of the second half of the data element occur at the same time and independently of each other from a clock synchronization standpoint.

17. The method of claim 16 wherein the command is a read command; wherein the data element includes a data field containing cached host data and a status field containing status indicating whether an earlier-performed read operation completed correctly; and wherein moving the data element includes the step of:

transferring the data field portion containing the cached host data in front of the status field portion containing the status indicating whether the earlier-performed read operation completed correctly to enable error detection to begin upon receipt of the data field portion while the status field portion is still being transferred.

18. In a volatile memory cache circuit of a data storage system, a point-to-point channel directly connecting to both an interface circuit and the volatile memory cache circuit, a method for exchanging data with the interface circuit, the method comprising the steps of:

receiving a command from the interface circuit through the point-to-point channel which directly connects to both the interface circuit and the volatile memory cache circuit, the point-to-point channel including a first link and a second link;

moving a data element through the point-to-point channel in accordance with the command, the step of moving including the step of conveying a first half of the data element through the first link and a second half of the data element through the second link, the step of conveying including the step of receiving the first half of the data element from a first transmitter of the interface circuit and concurrently receiving the second half of the data element from a second transmitter of the interface circuit;

reconstructing the data element from the first half of the data element and the second half of the data element; and providing status to the interface circuit through the point-to-point channel in accordance with the data element.

19. The method of claim 18 wherein the first and second links form a set of unidirectional links that carries signals from the interface circuit to the volatile memory cache circuit, and wherein the step of receiving the command from the interface circuit includes the step of:

obtaining the command from the interface circuit through the set of unidirectional links of the point-to-point channel.

20. The method of claim 19 wherein the point-to-point channel further includes another set of unidirectional links that carries signals from the volatile memory cache circuit to the interface circuit, and wherein the step of providing status to the interface circuit includes the step of:

sending the status to the interface circuit through the other set of unidirectional links of the point-to-point channel.

21. The method of claim 18 wherein the first link and the second link form a first set of unidirectional serial links that carries signals from the interface circuit to the volatile memory cache circuit, and a second set of unidirectional serial links that carries signals from the volatile memory cache circuit to the interface circuit; and wherein the step of moving the data element includes the steps of:

obtaining the data element from the interface circuit through the first set of unidirectional serial links when the command indicates a write transaction; and sending the data element to the interface circuit through the second set of unidirectional serial links when the command indicates a read transaction.

22. The method of claim 21 wherein each of the first set of unidirectional serial links and each of the second set of unidirectional serial links is an asynchronous link; wherein the step of obtaining includes the step of:

inputting a respective portion of the data element framed with synchronization delimiters from the interface circuit through each of the first set of unidirectional serial links when the command indicates a write transaction; and wherein the step of sending includes the step of:

outputting a respective portion of the data element framed with synchronization delimiters to the interface circuit through each of the second set of unidirectional serial links when the command indicates a read transaction.

23. The method of claim 21 wherein the step of obtaining includes the step of:

inputting a respective portion of the data element and a corresponding multiple bit error detection code from the interface circuit through each of the first set of unidirectional serial links when the command indicates a write transaction; and wherein the step of sending includes the step of:

outputting a respective portion of the data element and a corresponding multiple bit error detection code to the interface circuit through each of the second set of unidirectional serial links when the command indicates a read transaction.

24. The method of claim 21 wherein the step of obtaining includes the step of:

inputting portions of the data element as data codes through the first set of unidirectional serial links when the command indicates a write transaction;

wherein the step of sending includes the step of:

outputting portions of the data element as data codes through the second set of unidirectional serial links when the command indicates a read transaction; and wherein the data codes belong to an 8B/10B encoding/decoding data space.

25. The method of claim 21, further comprising the step of:

sending a busy signal to the interface circuit through each of the second set of unidirectional serial links after the step of receiving the command and before the step of moving the data element.

26. The method of claim 21 wherein the step of receiving the command includes the step of:

obtaining a tag indicator from the interface circuit through the first set of unidirectional serial links; and wherein the step of providing status includes the step of:

sending a copy of the tag indicator to the interface circuit through the second set of unidirectional serial links.

27. The method of claim 18 wherein the step of moving the data element through the point-to-point channel includes the step of:

providing the data element to the interface circuit; and wherein the step of providing the status to the interface circuit includes the step of:

sending a status message to the interface circuit, the status message including a tag originally obtained from the interface circuit during the step of receiving the command to enable the interface circuit to verify that the interface circuit is a proper recipient of the data element.

28. The method of claim 18 wherein the point-to-point channel further includes a third link and a fourth link, and wherein the step of providing the status to the interface circuit includes the steps of:

extracting a tag from the first half of the data element and sending a first half of a status message to the interface circuit through the third link the first half of the status message having a copy of the tag from the first half of the data element; and extracting a tag from the second half of the data element and sending a second half of the status message to the interface circuit through the fourth link, the second half of the status message having a copy of the tag from the second half of the data element, the tag being copied from the data element to the status message to indicate whether communications occurred between a correct interface and volatile memory cache circuits.

29. The method of claim 18 wherein the step of receiving the command from the interface circuit includes the step of:

obtaining the command at an end of the point-to-point channel for immediate processing by the volatile memory cache circuit.

30. The method of claim 29 wherein the volatile memory cache circuit combines with other volatile memory cache circuits to form a cache which is disposed between other interface circuits and non-volatile disk storage; and wherein the steps of receiving, moving and providing occur concurrently with exchanging of data through other point-to-point channels which directly connect the other interface circuits and the cache.

31. The method of claim 18 wherein the data element includes a series of even and odd numbered bytes; and wherein the step of receiving the first half of the data element and the second half of the data element includes the step of:

obtaining all of the even numbered bytes of the series within the first half of the data element exclusively through the first link of the point-to-point channel; and obtaining all of the odd numbered bytes of the series within the second half of the data element exclusively through the second link of the point-to-point channel.

32. The method of claim 31 wherein acquisition of the first half of the data element and acquisition of the second half of the data element occur at the same time and independently of each other from a clock synchronization standpoint.

33. The method of claim 32 wherein the command is a read command; wherein the data element includes a data field containing cached host data and a status field containing status indicating whether an earlier-performed read operation completed correctly; and wherein moving the data element includes the step of:

transferring the data field portion containing the cached host data in front of the status field portion containing the status indicating whether the earlier-performed read operation completed correctly to enable error detection to begin upon receipt of the data field portion while the status field portion is still being transferred.

34. A data storage system, comprising:

a volatile memory cache circuit that buffers data elements exchanged between a storage device and a host;

an interface circuit that operates as an interface between the volatile memory cache circuit and at least one of the storage device and the host; and a point-to-point channel, interconnected between the volatile memory cache circuit to the interface circuit, that carries the data elements between the volatile memory cache circuit and the interface circuit, the point-to-point channel directly connecting to both the interface circuit and the volatile memory cache circuit, the point-to-point channel including a first link configured to carry first halves of the data elements and a second link configured to carry second halves of the data elements, the interface circuit including a first transmitter and a second transmitter configured to concurrently transmit the first and second halves of the data elements respectively through the first and second links.

35. The data storage system of claim 34 wherein the first and second links form a set of unidirectional links that is capable of carrying a command from the interface circuit to the volatile memory cache circuit.

36. The data storage system of claim 35 wherein the point-to-point channel further includes another set of unidirectional links that is capable of carrying status from the volatile memory cache circuit to the interface circuit.

37. The data storage system of claim 34 wherein the first link and the second link form a first set of unidirectional serial links that carries signals from the interface circuit to the volatile memory cache circuit, and a second set of unidirectional serial links that carries signals from the volatile memory cache circuit to the interface circuit.

38. The data storage system of claim 37 wherein each of the first set of unidirectional serial links and each of the second set of unidirectional serial links is an asynchronous link; wherein the interface circuit is configured to provide a respective portion of a data element framed with synchronization delimiters to the volatile memory cache circuit through each of the first set of unidirectional serial links during a write transaction; and wherein the interface circuit is configured to obtain a respective portion of a data element framed with synchronization delimiters from the volatile memory cache circuit through each of the second set of unidirectional serial links during a read transaction.

39. The data storage system of claim 37 wherein the interface circuit is configured to provide a respective portion of a data element and a corresponding multiple bit error detection code to the volatile memory cache circuit through each of the first set of unidirectional serial links during a write transaction; and wherein the interface circuit is configured to obtain a respective portion of a data element and a corresponding multiple bit error detection code from the volatile memory cache circuit through each of the second set of unidirectional serial links during a read transaction.

40. The data storage system of claim 39 wherein the interface circuit is configured to provide portions of a data element as data codes to the volatile memory cache circuit through the first set of unidirectional serial links during a write transaction; and wherein the interface circuit is configured to obtain portions of a data element as data codes from the volatile memory cache circuit through the second set of unidirectional serial links during a read transaction; and wherein the data codes belong to an 8B/10B encodingldecoding data space.

41. The data storage system of claim 37 wherein the volatile memory cache circuit is configured to provide a busy signal to the interface circuit through each of the second set of unidirectional serial links after receiving a command and before a data element moves through the point-to-point channel.

42. The data storage system of claim 37 wherein the interface circuit is configured to provide a tag indicator to the volatile memory cache circuit through the first set of unidirectional serial links when providing a command to the volatile memory cache circuit; and wherein the volatile memory cache circuit is configured to provide a copy of the tag indicator to the interface circuit through the second set of unidirectional serial links when providing status to the interface circuit.

43. The data storage system of claim 34 wherein the interface circuit is configured to (i) associate tags with the data elements and transmit the tags to the volatile memory cache circuit with the data elements, and (ii) receive tags within status messages from the volatile memory cache circuit in response to the data elements to verify transmission of the status messages to a correct interface circuit among multiple interface circuits.

44. The data storage system of claim 34 wherein the volatile memory cache circuit directly connects to multiple front-end point-to-point channels which directly connect to respective front-end interfaces configured to communicate with external hosts, and further directly connects to multiple back-end point-to-point channels which directly connect to respective back-end interfaces configured to communicate with non-volatile storage devices.

45. The data storage system of claim 34, further comprising:
  other volatile memory cache circuits which, in combination with the volatile memory cache circuit, forms a cache;
  other interfaces configured to operate as interfaces between hosts and the cache; and
  other point-to-point channels that directly connect to both the other interfaces and the cache, the other point-to-point channels being configured to concurrently exchange data between the interfaces and the cache.

46. The data storage system of claim 34 wherein the data elements includes series of even and odd numbered bytes; and wherein the interface circuit is adapted to divide the data elements into the first halves and the second halves by:
  putting all of the even numbered bytes of the series into the first halves to enable the first transmitter to exclusively transmit only even numbered bytes through the first link of the point-to-point channel; and
  putting all of the odd numbered bytes of the series into the second halves to enable the second transmitter to exclusively transmit only odd numbered bytes through the second link of the point-to-point channel.

47. The data storage system of claim 46 wherein transmission of the first halves and transmission of the second halves occur at the same time and independently of each other from a clock synchronization standpoint.

* * * * *

UNITED STATES PATENT AND TRADEMARK OFFICE
CERTIFICATE OF CORRECTION

PATENT NO. : 6,948,031 B2
DATED : September 20, 2005
INVENTOR(S) : Kendell A. Chilton It is certified that error appears in the above-identified patent and that said Letters Patent is hereby corrected as shown below:

Column 23,
Line 16, "the third link the first half" should read -- the third link, the first half --.

Column 24,
Lines 64-65, "8B/10B encodingldecoding data space" should read -- 8B/10B encoding/decoding data space --.

Signed and Sealed this

Tenth Day of January, 2006

JON W. DUDAS
*Director of the United States Patent and Trademark Office*